No. 638,389.  
C. M. HANNIS.  
DEVICE FOR MENDING RUBBER TIRES.  
(Application filed Feb. 9, 1899.)  
Patented Dec. 5, 1899.

(No Model.)

Witnesses  
F. M. Bragg  
J. H. White

Inventor  
Charles M. Hannis  
By W. E. Simonds  
Attorney

UNITED STATES PATENT OFFICE.

CHARLES M. HANNIS, OF MIDDLETOWN, CONNECTICUT.

DEVICE FOR MENDING RUBBER TIRES.

SPECIFICATION forming part of Letters Patent No. 638,389, dated December 5, 1899.

Application filed February 9, 1899. Serial No. 705,142. (No model.)

*To all whom it may concern:*

Be it known that I, CHARLES M. HANNIS, a citizen of the United States of America, residing at Middletown, in the county of Middlesex and State of Connecticut, have invented a certain new and useful Improvement for Mending Rubber Tires of Bicycles, of which the following is a description, reference being had to the accompanying drawings, wherein—

Figure 1:
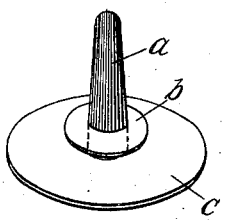
Figure 2:
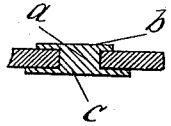

Figure 1 shows a view of the device previous to its use for mending a bicycle-tire. Fig. 2 is a view on a smaller scale than that of Fig. 1, a view in cross-section of a tire mended by the use of this device, the device cutting the section centrally.

The object of the improvement is denoted by its title—to wit, the production of a device for mending a puncture in a rubber bicycle-tire.

The device consists of a shank $a$, bearing two thin washers $b$ and $c$, flat on both sides. These parts are all integral with each other and they are of india-rubber. The washer $c$ is formed on the end of the shank, and the washer $b$ is formed intermediate the ends of said shank just as far above the washer $c$ as the thickness of the tire to be mended. Both washers are comparatively thin, have square edges and flat faces, and are sufficiently large in diameter to project some distance radially beyond the walls of the puncture when the plug is in place. This prevents the plug from being forced in and out by the enlargement of the puncture or by a strong pressure either inward or outward. The main purpose of the tapering shank is for use when inserting the plug. In fact, it has been found to be very difficult to insert a plug of this character unless it has a handle or shank of some description. The endmost washer is made considerably larger than the other washer for a twofold purpose: First, as the strongest pressure comes from the inside of the tire the broadest surface is usually needed there to resist it, especially when the puncture is large, and, second, should a puncture so small be received that it is impossible to insert the large washer therethrough the plug may be reversed and the shank and small washer be forced through the puncture.

In the ordinary use of the device the washer $c$ is worked through the puncture in the tire by holding the tapering shank $a$, when it will voluntarily flatten itself against the inside of the tire. At the same time the washer $b$ will be lying against the outside of the tire. Now cement is applied to the under surface of the washer $b$ and around the shank between the two washers, and this so freely that the cement works through the puncture and upon the upper surface of the washer $c$. Then by inflating the tire the washer $c$ is made to bear firmly against the inside thereof. Next the shank is cut off flush with the upper surface of the washer $b$ and pressure is applied to that upper surface, and matters are kept in this condition until the cement is sufficiently set, when the puncture will be found radically and substantially mended. Occasionally, however, when the puncture is very small the plug will be inverted from the position shown in Fig. 1 and the handle and small washer passed through the tire, as above described.

I claim as my improvement—

A plug for repairing tires, the same comprising a tapering rubber shank, a washer integral therewith at the end of said shank, and another washer also integral with said shank and formed intermediate the ends thereof just as far above the bottom washer as the thickness of the tire to be mended, both of said washers being larger than the shank and quite thin, with square edges and flat faces, and the endmost washer being larger than the other, substantially as set forth.

CHARLES M. HANNIS.

Witnesses:
WILBUR A. SNOW,
J. TH. ROLLERSTROM.